United States Patent
Cole et al.

(10) Patent No.: US 9,977,969 B1
(45) Date of Patent: May 22, 2018

(54) TRACK FUSION USING SIGINT OR ESTIMATED SPEED

(71) Applicant: Raytheon Company, Waltham, MA (US)

(72) Inventors: Robert J. Cole, Pa Furnace, PA (US); Geoffrey M. Guisewite, State College, PA (US); Michael R. Gabrovsek, Boalsburg, PA (US)

(73) Assignee: Raytheon Company, Waltham, MA (US)

( * ) Notice: Subject to any disclaimer, the term of this patent is extended or adjusted under 35 U.S.C. 154(b) by 1135 days.

(21) Appl. No.: 14/180,453

(22) Filed: Feb. 14, 2014

(51) Int. Cl.
*G06F 17/18* (2006.01)
*G06K 9/00* (2006.01)
*G06T 7/20* (2017.01)
*H04N 7/015* (2006.01)
*G06K 9/32* (2006.01)

(52) U.S. Cl.
CPC ..... *G06K 9/00758* (2013.01); *G06K 9/00771* (2013.01); *G06K 9/3241* (2013.01); *G06T 7/20* (2013.01); *H04N 7/0157* (2013.01)

(58) Field of Classification Search
CPC .................................. G06F 17/18; G06N 5/04
See application file for complete search history.

(56) References Cited

U.S. PATENT DOCUMENTS

2015/0205760 A1* 7/2015 Hershey ............... G06N 99/005
702/181

* cited by examiner

*Primary Examiner* — Andy Rao
(74) *Attorney, Agent, or Firm* — Schwegman Lundberg & Woessner, P.A.

(57) ABSTRACT

Generally discussed herein are systems and apparatuses that are configured to and techniques for matching track fragments. According to an example, a technique can include receiving data indicating a first and second actual ToA of first and second SIGINT signals at a collector, estimating first and second sets of estimated ToAs of the first and second SIGINT signals at a collector, respectively, each of the first and second sets of estimated ToAs based on a different track fragment of a first plurality of track fragments active at the first time and a different track fragment of a second plurality of track fragments active at the second time, respectively, or matching a track fragment of the first plurality of track fragments with a track fragment of the second plurality of track fragments based on the first and second sets of estimated ToAs and the first and second actual ToAs.

14 Claims, 9 Drawing Sheets

TRACK FUSION USING SIGINT OR ESTIMATED SPEED

TECHNICAL FIELD

Examples generally relate to fusing tracklets, and more specifically to fusing tracklets obtained through full motion video. The fusing can be accomplished using SIGnal INTelligence (SIGINT) data or an estimated speed of an object on a tracklet.

TECHNICAL BACKGROUND

SIGINT can be data gathered through signal interception or analysis. SIGINT can be broken into two broad categories: (1) COMmunications INTelligence (COMINT) and (2) ELectronic signal INTelligence (ELINT). COMINT deals with data gleaned from messages or voice information, while ELINT deals with data gleaned from non-communication sensors (e.g., Global Positioning System (GPS) sensors.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Examples in this disclosure relate to fusing or relating tracklets from video data using SIGINT data.

Exploitation of video surveillance data (e.g., persistent or wide-area video surveillance) can potentially provide a wide variety of intelligence products. The quality of those products can be dependent on the quality of extracted tracklets or track fragments (e.g., paths that follow a moving object, such as an object captured on video). Such tracks can be fragmented due to limitations in tracking technology or environmental factors that prevent non-occluded observations of a target (e.g., an object that is filmed). The track fragments may be related to each other through a process that can include manual analysis to determine which track fragments are associated with the same object.

In this disclosure, associating track fragments using SIGINT data is explored. A precision in spatial information provided by Full Motion Video (FMV) track fragments provides a basis for a fusion test metric, such as a test metric based on object speed. In cases where it is known that observed SIGINT corresponds to an emitter in a moving target within the FMV field of view, SIGINT observables can be used to help automate a track reconstruction or association process (e.g., providing an ability to associate two track fragments with the same object or transmitter).

Time of Arrival (ToA) of SIGINT signals at a collector can be leveraged in associating an object with a track fragment. A plurality of residuals can be calculated using the ToA(s), and the track fragments associated with the minimum of the calculated residuals can be deemed to be associated with the same object. A test statistic associated with object speed can provide another metric for track fragment association or track reconstitution.

Test results show that a speed statistic can reduce ambiguity across one or more noise level. The results can be sensitive to a variance of object speed and a relative speed between objects. In general, a speed differential between the true object and a false object can help the speed-based metric provide accurate track fragment association or reconstruction. In cases where such a speed differential between objects is present, the test results indicate that a reduction in a track fragment association error rate can be obtained over fusion or association using calculated residuals alone.

Figure 1:
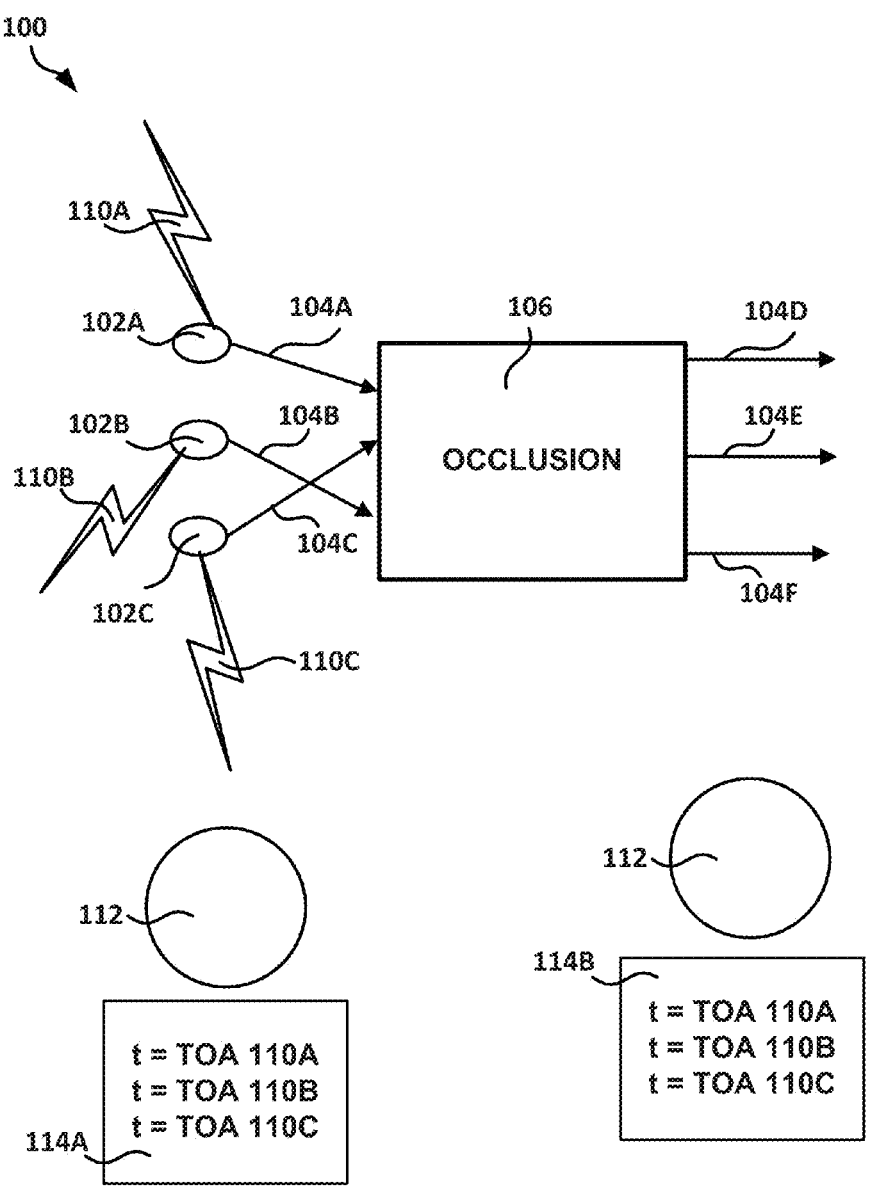
FIG. 1 shows an example of a system that can benefit from track fragment association.

FIG. 1 shows an example of a system 100 that includes multiple objects 102A, 102B, and 102C that are moving and each track fragment 104A, 104B, and 104C associated with the objects 102A-C, respectively. The video data associated with the track fragments 104A-C has been occluded or otherwise fragmented by an occlusion 106. It may not be readily apparent which track fragments 104A-C or objects 102A-C are associated with the track fragments 104A, 104B, and 104C, respectively.

The object 102A-C can emit a SIGINT signal 110A, 110B, and 110C, respectively. The SIGINT signal 110A-C can be received at a collector 112. The Time of Arrival (ToA) of the SIGINT signal 110A-C can be recorded, such as at 114A and 114B. The object 102A-C can be any object capable of being filmed and tracked using video, such as FMV.

Object 102A-C tracks extracted from FMV may be fragmented due to limitations in tracking technology and environmental factors, such as occlusions like tunnels, trees, mountains, light, or other obstructions to visualizing the object 102A-C that can create a period in which the object 102A-C can be un-observable or unrecognizable. The object 102A-C can continue moving such that it becomes observable or recognizable again, such that the object can be tracked again. Association of such track fragments 104A-F (e.g., track fragments that have occluded or include some sort of occlusion at the beginning or end of the track fragment) with SIGINT observations (e.g., SIGINT data received at collector 112 or processed, such as to associate a SIGINT signal 110A-C with an object 102A-C or track fragment 104A-C) can provide an opportunity to reconstitute, or fuse, track fragments 104A-C or 108A-C. In this disclosure, pairwise track fragments 104A-F association is discussed (e.g., associating each of 104A, 104B, and 104C with one of 104D, 104E, and 104F). Association of more than two track fragments can in principle be accomplished by repeated application of a track fusion process presented here.

Assume two SIGINT signals 110A-C have ToA $t_1$ and $t_2$, at collector 112, respectively. Each received SIGINT signal 110A-C is associated with a covariance and mean corresponding to a normal distribution. This can be represented as follows:

SIGINT1~$N(\mu_1,\Sigma_1)$

SIGINT2~$N(\mu_2,\Sigma_2)$

Also, assume a set of track fragments 104A-C $T_1$ were active at $t_1$ and a set of track fragments 104D-F $T_2$ were active at $t_2$. $T_1$ and $T_2$ can be such that they contain the same number of track fragments 104A-F and that they are non-overlapping. This can be represented as follows:

$|T_1|=|T_2|=n$ $T_1 \cap T_2 = \emptyset$

The number, n, can refer to the number of objects 102A-C that are being tracked in the video or can be a subset of the number of objects 102A-C that are being tracked in the video data. Thus, there can be n objects 102A-C and for each object 102A-C there can be two track fragments 104A-F, one set of track fragments 104A-C active at the first time index (e.g., $t_1$) and another set of track fragments 104D-F active at the second time index (e.g., $t_2$). In one or more embodiments, there are $n^2$ possible track reconstitutions. Track fragment 1 from the set of track fragments active at the first time index could be matched with any one of the n track fragments from the set of track fragments active at the second time index, and the same could be said about track fragment 2 to track fragment n in the set of track fragments active at the first time index. It can be assumed that n of the $n^2$ possibilities corresponds to a proper match between track fragments (e.g., one correct match for each of the track fragments in the set of track fragments active at time index 1), thus there can be $n^2$ hypotheses to consider. There can be actually $(n+1)^2$ hypotheses to consider if the null track (i.e. no track fragment in the set of track fragments active at the second time index matches with a track fragment active at the first time index) is a possible member of each set of track fragments. For simplicity, the former case is discussed herein, but one of ordinary skill in the art would understand how to add the null track to each set of track fragments. Also, the two sets of track fragments (i.e. the set of track fragments active at the first time index and the set of track fragments active at the second time index) need not contain the same number of track fragments. The first set of track fragments (e.g., the set of track fragments active at the first time index) can contain greater or fewer track fragments (e.g., with or without the null track fragment) than the second set of track fragments (e.g., the set of track fragments active at the second time index).

A goal is to associate an object 102A-C or a track fragment 104A-F with another track fragment 104A-F from the set of n candidates.

General Approach

One or more techniques for associating track fragments 104A-F to the same object 102A-C or to one another can include estimating an object 102A-C position at a SIGINT signal 110A-C ToA. The technique can include computing a residual value (e.g., score, such as a normalized value or score) for each hypothesis track fragment 104A-F. The residual can be a sum of squared ToA errors averaged over the two track fragments 104A-F that may be associated. The track fragment 104A-F pair with a smallest calculated residual can be associated with each other. This can be represented as follows:

$$\text{solution track} = \underset{u \in T_1, v \in T_2}{\text{argmin}} \{R(\{u \cup v\})\}$$

where R(t) is a function returning the normalized residual of track fragment T. Since the residual for a given track fragment 104A-F can be independent of that of any other track fragment 104A-F, note that separate searches can be performed in each track fragment set to obtain the smallest calculated residual from each set. This can be represented as follows:

$$\text{solution track} = \underset{u \in T_1}{\text{argmin}}\{R(u)\} \cup \underset{v \in T_2}{\text{argmin}}\{R(v)\}$$

Prior research indicates that increasing the number of SIGINT signal 110A-C ToAs included in a particular track fragment's 104A-F residual computation can lower the error rate in track fragment 104A-F association. A worst case error rate can correspond to a one SIGINT signal 110A-C ToA per track fragment 104A-F. This case can be used to evaluate the effectiveness of one or more embodiments discussed herein.

One or more embodiments can include using a speed metric to associate track fragments 104A-F. Video can provide accurate spatial information regarding object 102A-C position. Similarly, SIGINT can provide accurate temporal information regarding SIGINT signal 110A-C transmission event times. These can be used singularly or in combination to determine a precise location of a candidate object 102A-C. The spatial video information can be used to obtain an estimate of an object's 102A-C speed. A distance between two track fragments 104A-F that might be associated can be determined and an elapsed time between the end of one track fragment 104A-F and the beginning of the other track fragment 104A-F can be used to estimate a speed of an object 102A-C between the track fragments 104A-F.

The object's 102A-C speed can be compared to a distribution of speeds (e.g., an average of the distribution of speeds) calculated using SIGINT signal 110A-C data, such as to test a similarity between a candidate track fragment 104A-F combination to a SIGINT signal 110A-C pairing or to provide an indication of how likely it is that two track fragments 104A-F should be associated with each other or fused.

An example of a speed-based metric S for a given speed vector x can be represented as follows:

$S=F_x(x)$ where $F_x(x)$ represents the cumulative distribution function value for speed vector x and F represents the difference in speeds implied by the uncertain locations of the two SIGINT signals. The derivation of this example speed metric is presented at the end of this section.

The speed metric S can be a basis for a track fragment 104A-F fusion process. A solution track fragment 104A-F can be represented as follows:

$$\text{solution track} = \underset{u \in T_1, v \in T_2}{\text{argmin}} \{R(\{u \cup v\})S(\{u \cup v\})\}$$

Pseudo-code of technique configured to implement a combined track fragment residual and speed metric approach to associating track fragments 104A-F to an object 102A-C or one another is now discussed. Note that just the speed metric or the track fragment 104A-F residual can be used independently to associate track fragments 104A-F. However, combining the two can result in more accurate or dependable results.

Pseudo-code for the technique can be represented as follows:

Routine Title: AssociateTrackFragments
Description:
Given a pair of associated SIGINT signals 110A-C (e.g., SIGINT signals 110A-C determined to be from the same object 102A-C or transmitter), along with a corresponding collector ephemeris (e.g., a known or determinable location for each collector 112) and ToAs of the SIGINT signals 110A-C, construct hypotheses regarding fused tracks. Score each hypothesis based on residual error or a speed metric.
Inputs:
2 SIGINT signals with locations: $\{\mu_1, \mu_2\}$ and covariances $\{\Sigma_1, \Sigma_2\}$ (e.g., the covariance can indicate a confidence that the location is the actual location that the SIGINT signal originated from); A set of 2 sets of TOA measurements, $TOA^j$: For each SIGINT observation j, a set of TOA measurements: $TOA^j = \{TOA_i^j\}$, $1 \le i \le L$, where L is the number of collectors; A set of 2 approximated SIGINT signal transmission times: $T = \{t_1, t_2\}$; collector ephemeris E; A set $T_1$ of N video track fragments active at $t_1$ and a set $T_2$ of M video track fragments active at $t_2$.
Output:
An augmented track defined by the indexes into $T_1$ and $T_2$
Pseudo-code for the routine AssociateTrackFragments can include: $H \leftarrow T_1 \times T_2$% generate bounding area containing H track fragments, where H is a % set of Hypotheses indexed by i. A hypothesis, $h_i$ can include a fragment from set % $T_1$ and a fragment from set $T_2$.
For i=1:|H|
  pos1 ← getInterpolatedPosition($h_i, t_1$)
  pos2 ← getInterpolatedPosition($h_i, t_2$)
  $r_i$ ← getormalizedResidual(pos1, pos2, E, $TOA^1$, $TOA^2$)
  $s_i$ ← getSpeedMetric($h_i$, $t_1$, $t_2$, $\mu_1$, $\mu_2$, $\Sigma_1$, $\Sigma_2$)
  $c_i \rightarrow r_i s_i$
END FOR
HypothesisIndex ← arg min$\{c_i\}$
Return getTrackFragmentIndexes(HypothesisIndex)
Derivation of an Example Speed Metric
Consider two bivariate normal random variables, X and Y:

$$X = \begin{bmatrix} x_1 \\ x_2 \end{bmatrix}$$

$$X \sim N(\mu_X, \Sigma_X)$$

$$Y = \begin{bmatrix} y_1 \\ y_2 \end{bmatrix}$$

$$Y \sim N(\mu_Y, \Sigma_Y)$$

where $$\mu_X = \begin{bmatrix} \bar{x}_1 \\ \bar{x}_2 \end{bmatrix}, \Sigma_X = \begin{bmatrix} \sigma_{x1}^2 & \rho_X \sigma_{x1} \sigma_{x2} \\ \rho_X \sigma_{x1} \sigma_{x2} & \sigma_{x2}^2 \end{bmatrix}$$

$$\mu_Y = \begin{bmatrix} \bar{y}_1 \\ \bar{y}_2 \end{bmatrix}, \Sigma_Y = \begin{bmatrix} \sigma_{y1}^2 & \rho_Y \sigma_{y1} \sigma_{y2} \\ \rho_Y \sigma_{y1} \sigma_{y2} & \sigma_{y2}^2 \end{bmatrix}$$

Let $\mu_X$ and $\mu_Y$ represent location estimates at times $t_1$ and $t_2$ of object x and y, respectively. Let $\Sigma_x$ and $\Sigma_y$ represent confidence intervals of the respective location estimates. Let $\Delta = t_1 - t_2$. An estimate and confidence $\rho$-level bound for the speed, z, of the an object 102A-C, can be given by:

$$z = \frac{\sqrt{(y_1 - x_1)^2 + (y_2 - x_2)^2}}{\Delta} = \sqrt{(y_1' - x_1')^2 + (y_2' - x_2')^2}$$

where $$y_1' = \frac{y_1}{\Delta}, y_2' = \frac{y_2}{\Delta}$$

$$x_1' = \frac{x_1}{\Delta}, x_2' = \frac{x_2}{\Delta}$$

Consider intermediate variables $z_1 = y_1' - x_1'$ and $z_2 = y_2' - x_2'$. As differences of normal random variables, these intermediate variables are also normally distributed. This can be represented as follows:

$$z_1 \sim N\left(\frac{\bar{y}_1 - \bar{x}_1}{\Delta}, \frac{\sigma_{x1}^2 + \sigma_{y1}^2}{\Delta}\right)$$

$$z_2 \sim N\left(\frac{\bar{y}_2 - \bar{x}_2}{\Delta}, \frac{\sigma_{x2}^2 + \sigma_{y2}^2}{\Delta}\right)$$

In terms of the intermediate variables, z can be given by:

$$z = \sqrt{z_1^2 + z_2^2}$$

Unfortunately, no standard distribution is defined for $z_1^2$ or $z_2^2$. Neither the chi-squared or non-central chi-squared distribution can be used here since both variables are the square of a normal with non-zero mean and non-unity variance.

In the absence of a standard distribution, $z_1^2$ and $z_2^2$ can be estimated. Consider a relationship $u = v^2$. Given the density $f_V(v)$, the density $f_U(u)$ can be estimated as:

$$f_U(u)du = f_V(-\sqrt{u})dv + f_V(\sqrt{u})dv$$

Using this estimation approach, the domains of $z_1^2$ and $z_2^2$ can be discretized and can estimate the densities of these variables at sampled points. Having estimated the distributions of $z_1^2$ and $z_2^2$, the distribution of their sum using characteristic functions can also be estimated. Let $\varphi_1$ and $\varphi_2$ represent the characteristic functions of $z_1^2$ and $z_2^2$, respectively (i.e. $\varphi_1 = F^{-1}(z_1^2)$ and $\varphi_2 = F^{-1}(z_2^2)$ where $F^{-1}$ is the inverse Fourier transform). It is a property of characteristic functions that the characteristic function of a sum of random variables can be given by the product of the characteristic functions of the individual random variables. The distribution of $g = z^2 = z_1^2 + z_2^2$ can thus be:

$$f_G(g) \sim F(\varphi_1 \varphi_2)$$

With the estimated density of g, another direct estimation can be done. In this case, the relationship $u=\sqrt{v}$ can be used in the direct estimation. Given the density $f_V(v)$, the density $f_U(u)$ can be estimated as follows:

$$f_U(u)du=f_V(u^2)dv$$

Evaluation Methodology

The effectiveness of track fusion via residual, speed metric, and combined speed/residual metrics discussed herein was evaluated and is summarized herein. A simulation in which two objects 102A-C are constrained to move along a straight road under conditions creating ambiguity based on residuals alone was performed. In each trial, the object 102A-C associated with the SIGINT signal 110A-C travels at a speed of 50 km/hr plus a normal variance, with a magnitude that is a simulation parameter. Two SIGINT signal 110A-C transmissions are simulated using a three collector 112 Time Difference of Arrival (TDOA) based location estimation process (e.g., the differences in ToAs at collectors 112 is used to calculate a position of an abject at the time of transmission of a SIGINT signal 110A-C). Noise associated with the SIGINT signal 110A-C transmission and reception process is another simulation parameter. Three levels of noise were used: 1e11 ns$^2$, 1e-12 ns$^2$ and 1e-13 ns$^2$. Simulated SIGINT signal 110A-C transmission times occurred at simulation times of 40 and 300 seconds.

Three magnitudes of speed standard deviations (STD) were simulated: 1 km/hr, 2.5 km/hr, and 5 km/hr. Combined with the three levels of noise, a total of nine simulation scenarios were run, see FIGS. 2A, 2B, and 2C for relatively high noise level simulations at speed standard deviations 1 km/hr, 2.5 km/hr, and 5 km/hr, respectively; FIGS. 3A, 3B, and 3C for medium noise level simulations at speed standard deviations 1 km/hr, 2.5 km/hr, and 5 km/hr, respectively; and FIGS. 4A, 4B, and 4C for relatively low noise level simulations at speed standard deviations 1 km/hr, 2.5 km/hr, and 5 km/hr, respectively. In each scenario, a parameter controlling the relative mean speed difference (relative speed) between the two movers was varied from 1 km/hr to 10 km/hr. One thousand simulation trials was run for each combination of simulation parameters.

In each trial, video tracks were simulated at a frame rate of one frame/sec. Track fragments were formed by taking 60 seconds of frames centered at each SIGINT signal 110A-C transmission time. With two objects, a total of four candidate hypotheses were evaluated. Evaluation was performed by computing the residual, speed metric, and combined residual and speed metrics for each hypothesis and taking the lowest score in each case. The number of incorrect decisions out of the 1,000 trials, divided by the number of trials (in this case 1,000) was recorded as the error rate for that simulation scenario.

Figure 2A:
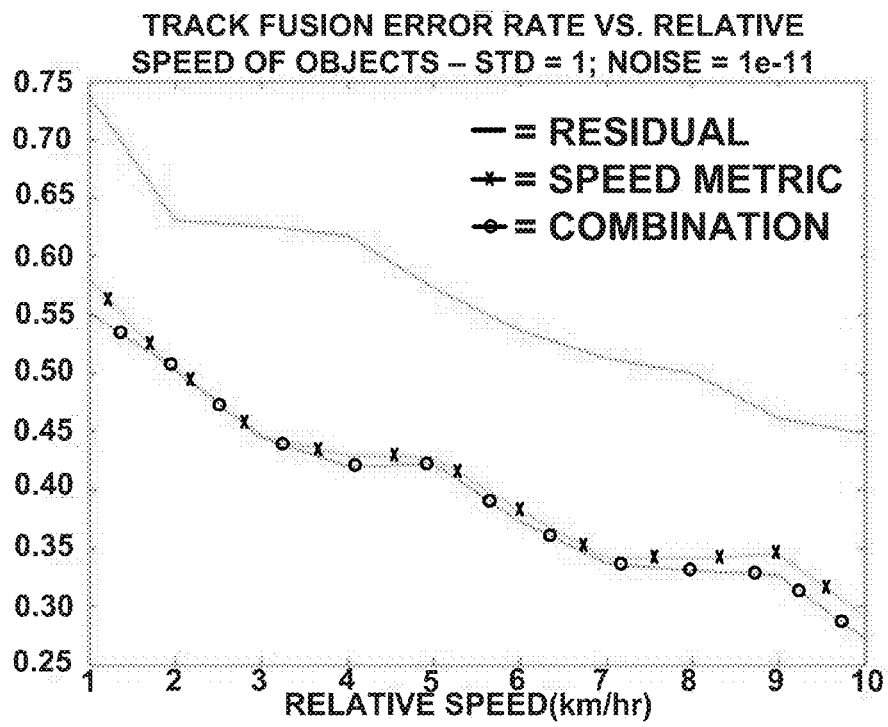
FIGS. 2A, 2B, and 2C show examples of line graphs of a simulation of a technique discussed herein that includes relatively high noise level SIGINT signals and a speed difference Standard Deviation (STD) of one, two and a half (2.5), and five, respectively.
Figure 2B:
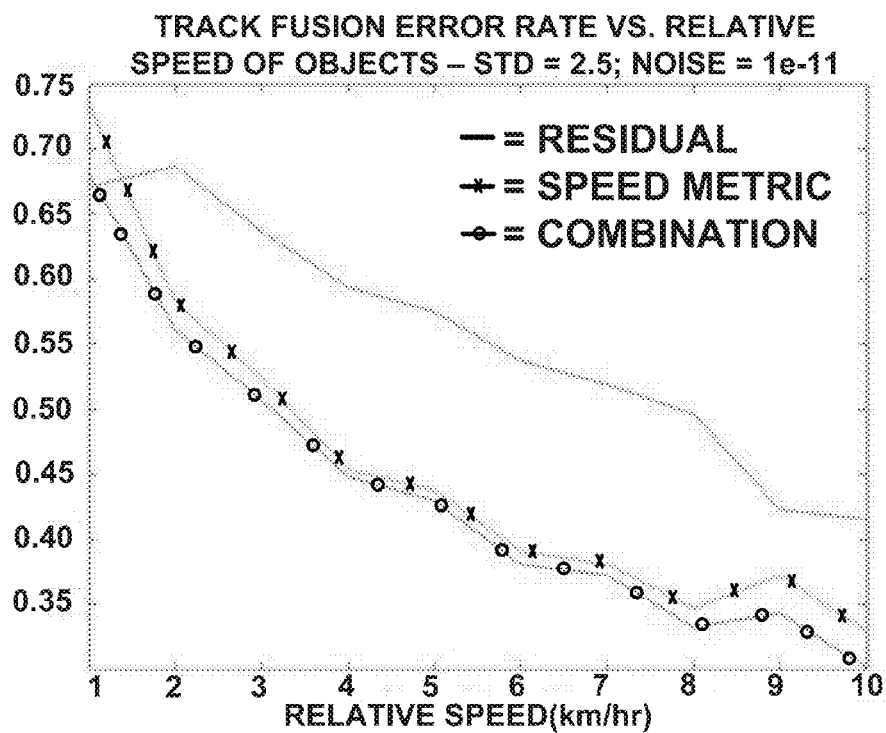
Figure 2C:
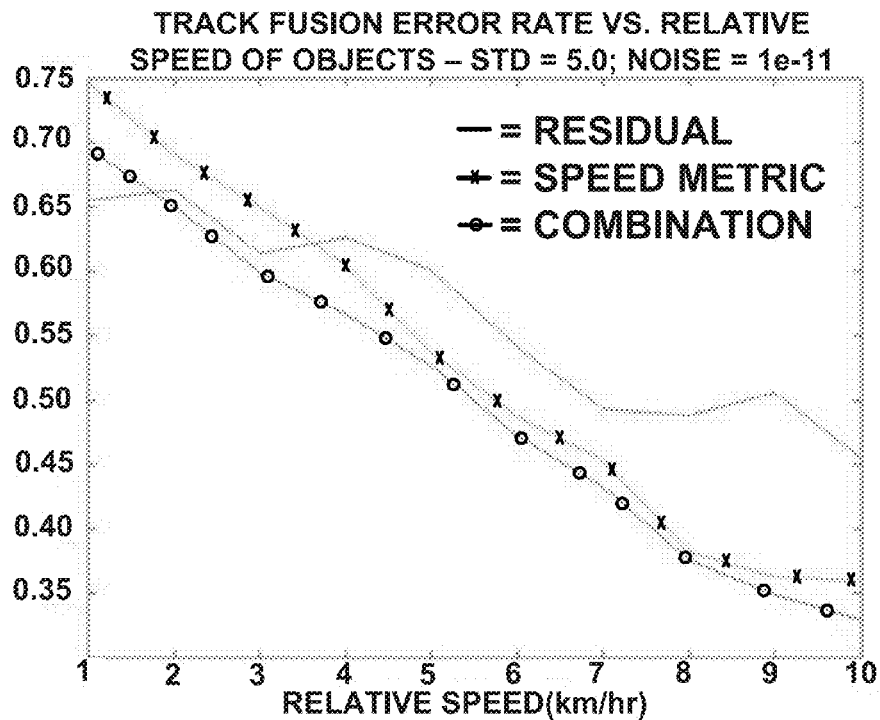
Figure 3A:
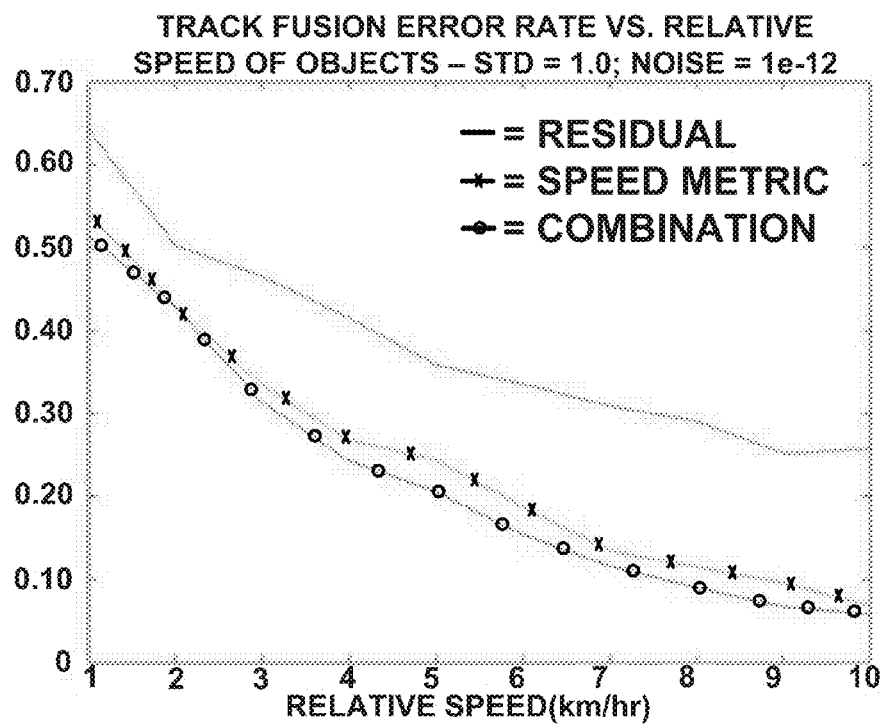
FIGS. 3A, 3B, and 3C show examples of line graphs of a simulation of a technique discussed herein that includes medium noise level SIGINT signals and a speed difference Standard Deviation (STD) of one, two and a half (2.5), and five, respectively.
Figure 3B:
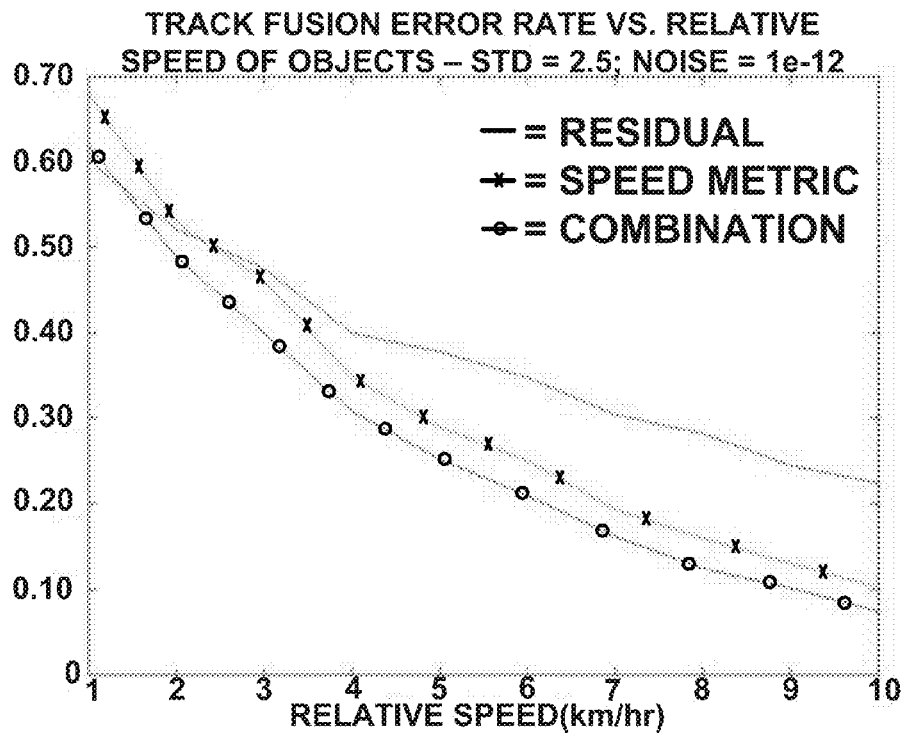
Figure 3C:
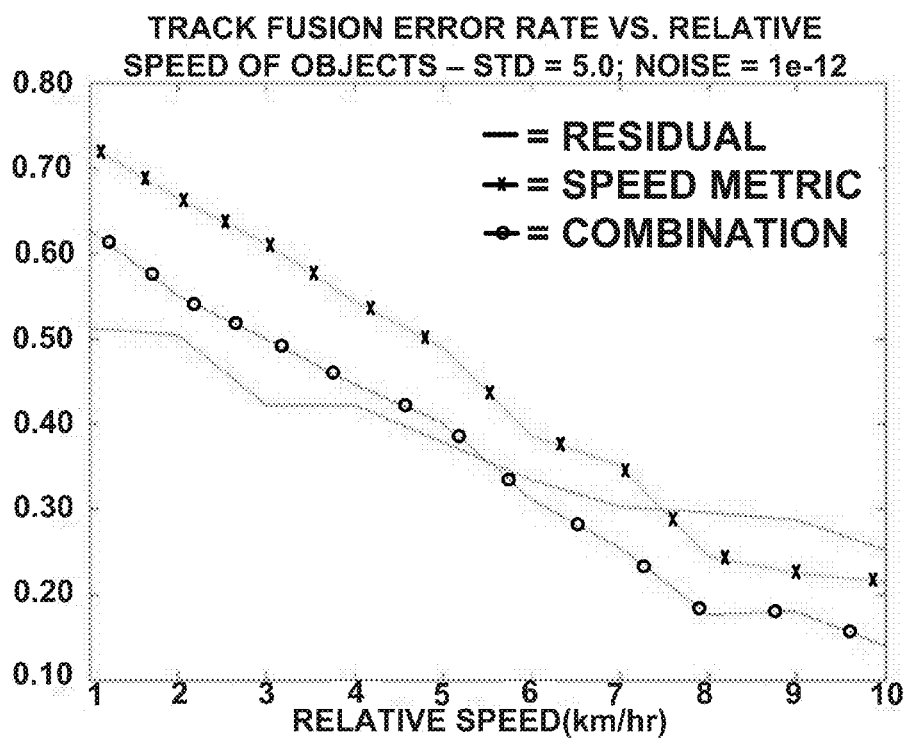

FIGS. 2A, 2B, and 2C show line graphs of the previously discussed trials using a relatively high SIGINT signal 110A-C noise level. In general, FIGS. 2A, 2B, and 2C demonstrate that associating track fragments 104A-F using the combined speed metric and residual is generally the most accurate approach in relatively high noise situations.

FIGS. 3A, 3B, and 3C show line graphs of the previously discussed trials using a medium SIGINT signal 110A-C noise level. In general, FIGS. 3A, 3B, and 3C demonstrate that associating track fragments 104A-F using the combined speed metric and residual is generally the most accurate approach in medium noise situations, unless the relative speed is low, in which case using the residual alone can be more accurate than using the combined approach.

Figure 4A:
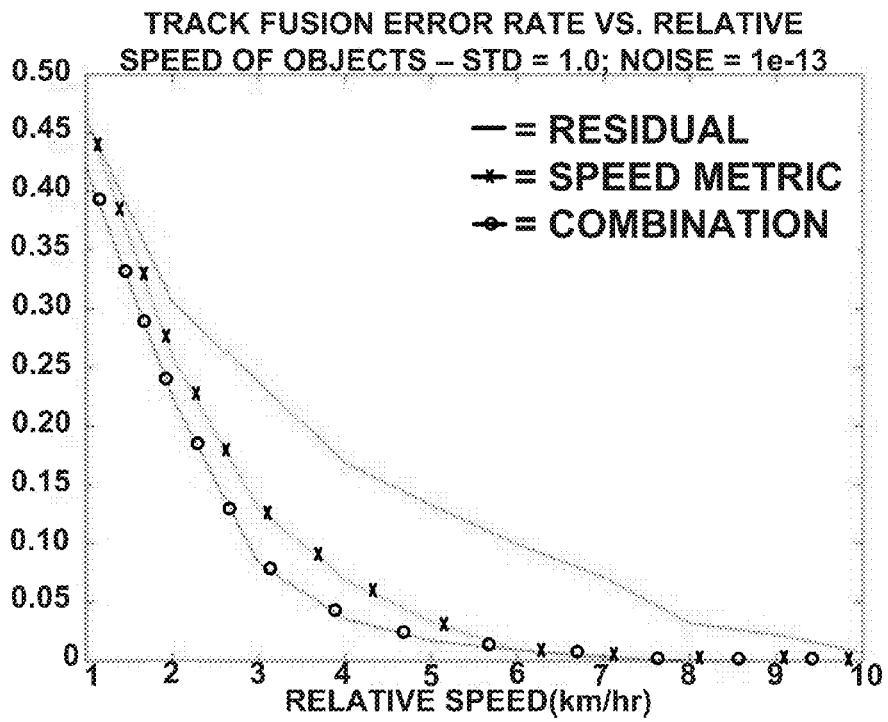
FIGS. 4A, 4B, and 4C show examples of line graphs of a simulation of a technique discussed herein that includes a relatively low noise level SIGINT signal and a speed difference Standard Deviation (STD) of one, two and a half (2.5), and five, respectively.
Figure 4B:
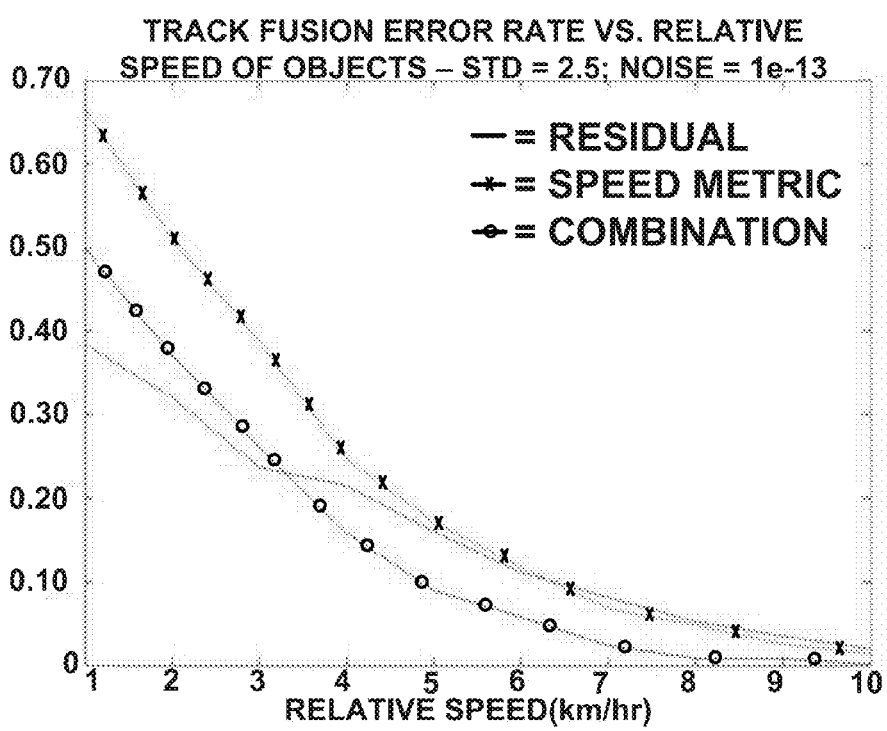
Figure 4C:
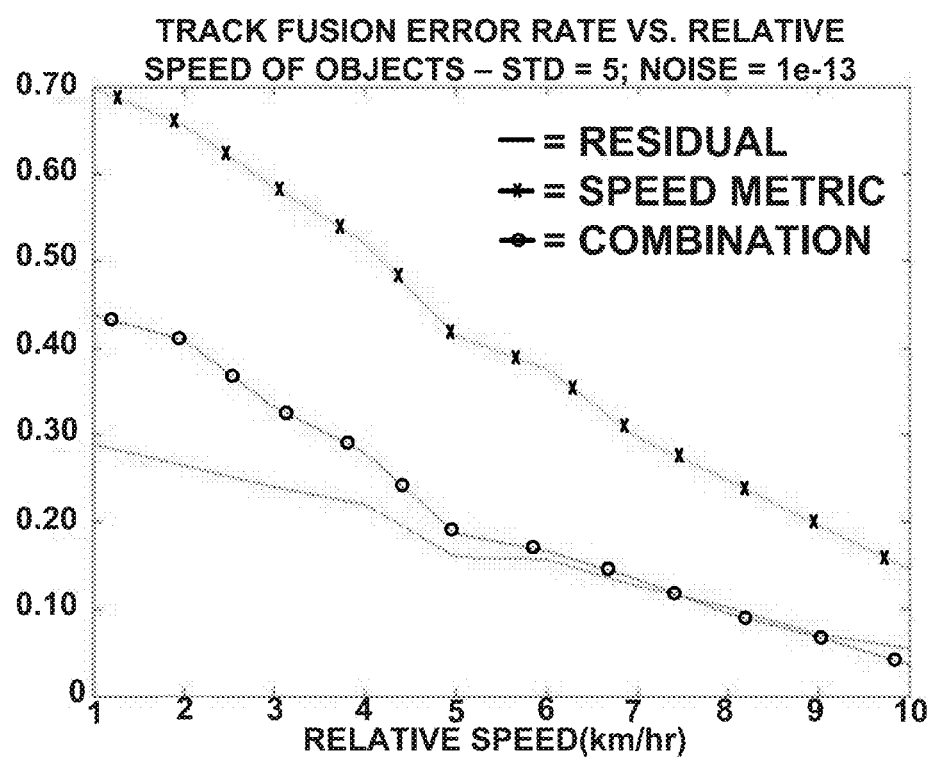

FIGS. 4A, 4B, and 4C show line graphs of the previously discussed trials using a low SIGINT signal 110A-C noise level. In general, FIGS. 4A, 4B, and 4C demonstrate that associating track fragments 104A-F using the combined speed metric and residual is generally the most accurate approach in relatively low noise situations, unless the relative speed is low, in which case using the residual alone can be more accurate than using the combined approach.

Figure 5:
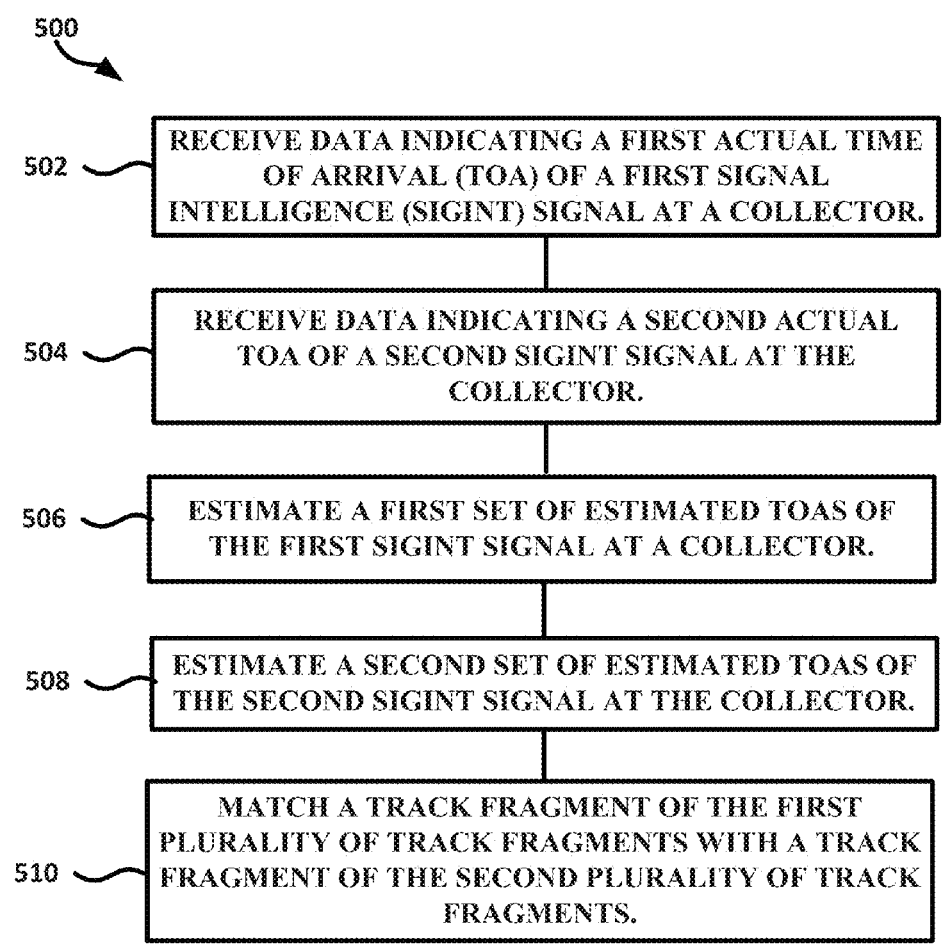
FIG. 5 shows a block diagram of an example of a technique for associating track fragments.

FIG. 5 shows an example of a technique 500 for associating track fragments 104A-F. At 502, data indicating a first actual ToA of a first SIGINT signal 110A-C at a collector 108 can be received. At 504, data indicating a second actual ToA of a second SIGINT signal 110A-C at the collector 108 can be received. The second actual ToA can be after the first actual ToA. The first and second SIGINT signals 110A-C can originate from the same emitter or object 102A-C. At 506, a first set of estimated ToAs of the first SIGINT signal 110 B at the collector 108 can be estimated. Each of the first set of estimated ToAs can be based on a different track fragment 104A-F of a first plurality of track fragments active at the first time.

At 508, a second set of estimated ToAs of the second SIGINT signal at the collector 108 can be estimated. Each of the second set of estimated ToAs can be based on a different track fragment 102A-C of a second plurality of track fragments active at the second time.

The technique 500 can include estimating a first location and a first covariance of the first SIGINT signal. The first covariance can define a confidence interval associated with the first SIGINT signal 110A-C originating from the first location. The technique 500 can include estimating a second location and second covariance of the second SIGINT signal. The second covariance can define a confidence interval associated with the second SIGINT signal 110A-C originating from the second location. The technique 500 can include calculating a plurality of residual errors. Each residual error can be calculated based on the first and second locations and the first and second estimated ToAs.

The technique 500 can include generating a first bounding area based on the first covariance, the bounding area indicating a region in which the first SIGINT signal originated. The technique 500 can include determining track fragments that are within the first bounding area so as to define which tracks are in the first plurality of track fragments. The technique 500 can include generating a second bounding area based on the second covariance, the bounding area indicating a region in which the first SIGINT signal originated. The technique 500 can include determining track fragments that are within the second bounding area so as to define which tracks are in the second plurality of track fragments.

The technique 500 can include estimating a plurality of average speeds. Each average speed of the plurality of average speeds can estimate how fast an object on a track fragment from the first plurality of track fragments would have been moving if the track fragment from the first plurality of track fragments is matched with a track fragment from the second plurality of track fragments. Estimating the plurality of average speeds can include estimating the plurality of average speeds based on the estimated first and second locations and first and second actual ToAs.

The technique 500 can include determining a set of actual speeds of the object based on (1) a distance between a track fragment of the first plurality of track fragments and a second track fragment of the second plurality of track fragments or (2) an elapsed time from the end of the first track fragment to the beginning of the second track fragment.

The technique 500 can include determining a plurality of probability statistics. Each probability statistic of the plurality of probability statistics can be based on an actual speed of the set of actual speeds and a corresponding estimated average speed of the plurality of average speeds.

At 510, a track fragment 104A-C of the first plurality of track fragments can be matched with a track fragment 104D-F of the second plurality of track fragments based on the first and second sets of estimated ToAs and the first and second actual ToAs. Matching the track fragment from the first plurality of track fragments with a track fragment of the second plurality of track fragments can include matching the track fragments based on a residual error. Matching the track fragment from the first plurality of track fragments with a track fragment of the second plurality of track fragments can include matching the track fragments based on estimated average speeds. Matching the track fragment of the first plurality of track fragments with a track fragment of the second plurality of track fragments can include matching the track fragments based on determined actual speeds. Matching the track fragment from the first plurality of track fragments with a track fragment of the second plurality of fragments includes matching the track fragments corresponding to a smallest residual error of the plurality of residual errors, a highest probability statistic of the plurality of probability statistics, or a combination thereof.

Figure 6:
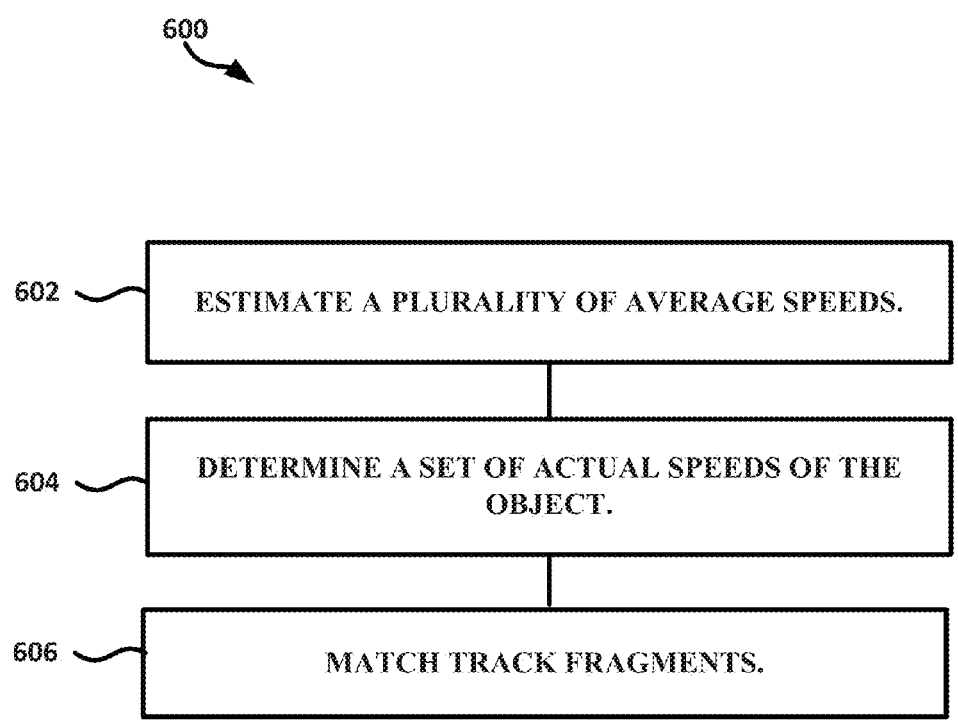
FIG. 6 shows a block diagram of an example of a technique for associating track fragments.

FIG. 6 illustrates a block diagram of an example of a technique 600 for associating track fragments 104A-F. At 602, a plurality of average speeds can be estimated. Each average speed of the plurality of average speeds can be an estimate of how fast an object 102A-C on a track fragment 104A-C of the first plurality of track fragments would have been moving if the track fragment from the first plurality of track fragments 104A-C is a match with a track fragment 104D-F from the second plurality of track fragments. At 604, a set of actual speeds of the object 102A-C can be determined. The actual speeds can be determined based on (1) a distance between a track fragment 104A-C of the first plurality of track fragments and a second track fragment 104D-F of the second plurality of track fragments or (2) an elapsed time from the end of the first track fragment 104A-C to the beginning of the second track fragment 104D-F. At 606, track fragments 104A-F can be matched. Matching the track fragments 104A-F can include matching a track fragment 104A-C from the first plurality of track fragments with a track fragment 104D-F from the second plurality of track fragments. Matching track fragments can be based on the estimated plurality of average speeds or the set of actual speeds.

The technique 600 can include determining a plurality of probability statistics. Each probability statistic of the plurality of probability statistics can be based on an actual speed of the set of actual speeds and a corresponding estimated average speed of the plurality of average speeds. Matching the track fragment 104A-C from the first plurality of track fragments with a track fragment 104D-F of the second plurality of fragments corresponding to a smallest residual error of the plurality of residual errors, a highest probability statistic of the plurality of probability statistics, or a combination thereof. The technique 600 can be combined with at least a portion of the technique 500, so as to help match a track fragment 104A-C with another track fragment 104D-F.

Figure 7:
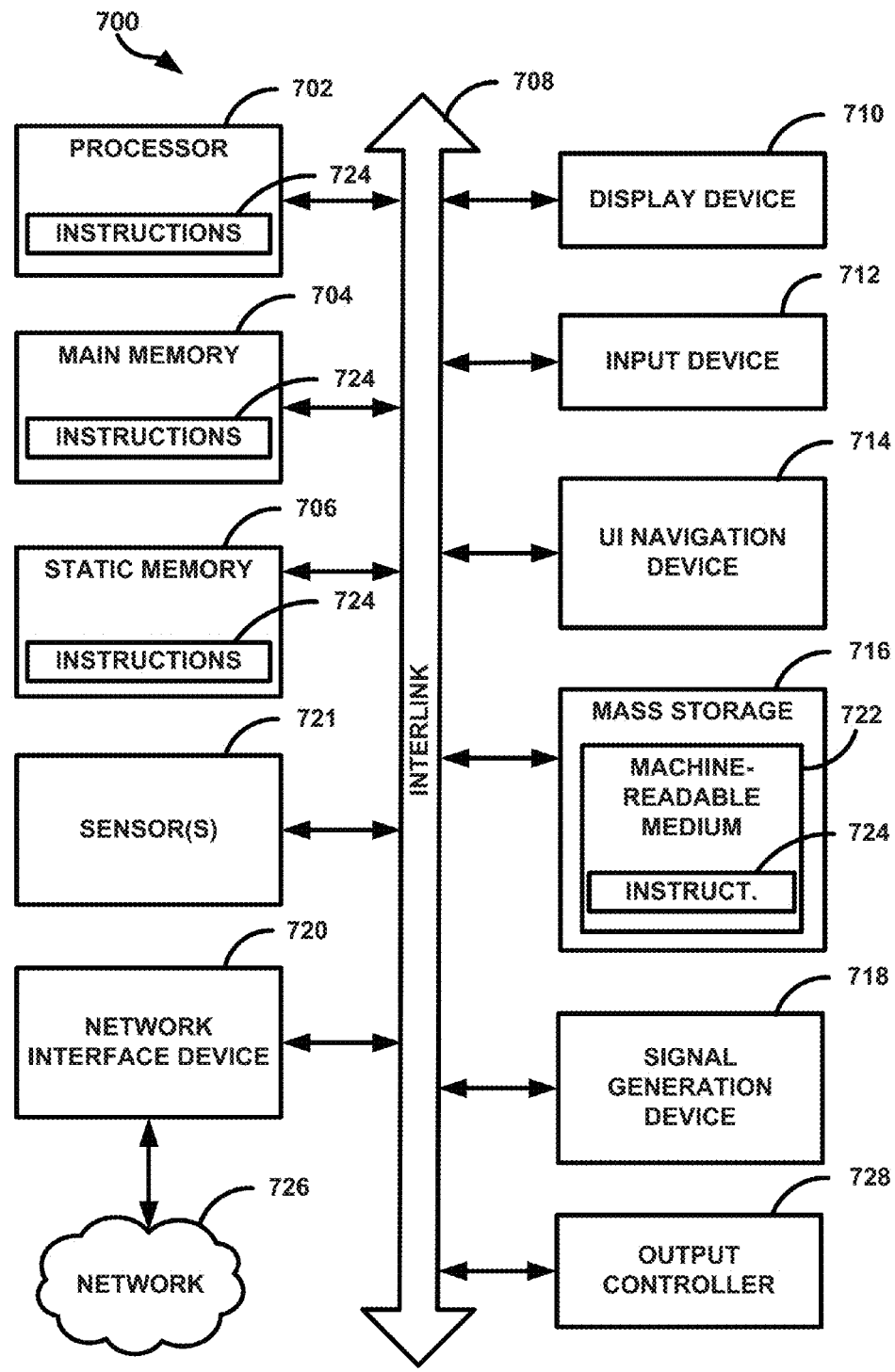
FIG. 7 shows a block diagram of an example of a machine upon which any of one or more techniques (e.g., methods) or processes discussed herein may be performed.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

EXAMPLES AND NOTES

The present subject matter may be described by way of several examples.

Example 1 can include or use subject matter (such as an apparatus including a processor configured to perform acts, a method, a means for performing acts, or a device readable memory including instructions that, when performed by the device, can cause the device to perform acts), such as can include or use (1) receiving data indicating a first actual Time of Arrival (ToA) of a first SIGnal INTelligence (SIGINT) signal at a collector, (2) receiving data indicating a second actual ToA of a second SIGINT signal at the collector, the second actual ToA after the first actual ToA, the first and second SIGINT signals originating from the same emitter, (3) estimating a first set of estimated ToAs of the first SIGINT signal at a collector, each of the first set of estimated ToAs based on a different track fragment of a first plurality of track fragments active at the first time, (4) estimating a second set of estimated ToAs of the second SIGINT signal at the collector, each of the second set of estimated ToAs based on a different track fragment of a second plurality of track fragments active at the second time, or (5) matching a track fragment of the first plurality of track fragments with a track fragment of the second plurality of track fragments based on the first and second sets of estimated ToAs and the first and second actual ToAs.

Example 2 can include or use, or can optionally be combined with the subject matter of Example 1, to include or use (1) estimating a first location and a first covariance of the first SIGINT signal, the first covariance defining a confidence interval associated with the first SIGINT signal originating from the first location, (2) estimating a second location and second covariance of the second SIGINT signal, the second covariance defining a confidence interval associated with the second SIGINT signal originating from the second location, (3) calculating a plurality of residual errors, each residual error calculated based on the first and second locations and the first and second estimated ToAs, or (4) wherein matching the track fragment from the first plurality of track fragments with a track fragment of the second plurality of track fragments includes matching the track fragments based on the residual errors.

Example 3 can include or use, or can optionally be combined with the subject matter of at least one of Examples 1-2, to include or use generating a first bounding area based on the first covariance, the bounding area indicating a region in which the first SIGINT signal originated, or determining track fragments that are within the first bounding area so as to define which tracks are in the first plurality of track fragments.

Example 4 can include or use, or can optionally be combined with the subject matter of at least one of Examples 1-3, to include or use generating a second bounding area based on the second covariance, the bounding area indicating a region in which the first SIGINT signal originated, or determining track fragments that are within the second bounding area so as to define which tracks are in the second plurality of track fragments.

Example 5 can include or use, or can optionally be combined with the subject matter of at least one of Examples 1-4, to include or use estimating a plurality of average speeds, each average speed of the plurality of average speeds estimating how fast an object on a track fragment from the first plurality of track fragments would have been moving if the track fragment from the first plurality of track fragments is matched with a track fragment from the second plurality of track fragments, or wherein matching the track fragment from the first plurality of track fragments with a track fragment of the second plurality of track fragments includes matching the track fragments based on the estimated average speeds.

Example 6 can include or use, or can optionally be combined with the subject matter of Example 5, to include or use wherein estimating the plurality of average speeds includes estimating the plurality of average speeds based on the estimated first and second locations and first and second actual ToAs. Example 6 can optionally include or use determining a set of actual speeds of the object based on (1) a distance between a track fragment of the first plurality of track fragments and a second track fragment of the second plurality of track fragments and (2) an elapsed time from the end of the first track fragment to the beginning of the second track fragment, or wherein matching the track fragment of the first plurality of track fragments with a track fragment of the second plurality of track fragments includes matching the track fragments based on the determined actual speeds.

Example 7 can include or use, or can optionally be combined with the subject matter of at least one of Examples 1-6, to include or use determining a plurality of probability statistics, each probability statistic of the plurality of probability statistics based on an actual speed of the set of actual speeds and a corresponding estimated average speed of the plurality of average speeds, or wherein matching the track fragment from the first plurality of track fragments with a track fragment of the second plurality of fragments includes matching the track fragments corresponding to a smallest residual error of the plurality of residual errors, a highest probability statistic of the plurality of probability statistics, or a combination thereof.

Example 8 can include or use subject matter (such as an apparatus including a processor configured to perform acts, a method, a means for performing acts, or a device readable memory including instructions that, when performed by the device, can cause the device to perform acts), such as can include or use (1) estimating a plurality of average speeds, each average speed of the plurality of average speeds estimating how fast an object on a track fragment of the first plurality of track fragments would have been moving if the track fragment from the first plurality of track fragments is a match with a track fragment from the second plurality of track fragments, (2) determining a set of actual speeds of the object based on (i) a distance between a track fragment of the first plurality of track fragments and a second track fragment of the second plurality of track fragments or (ii) an elapsed time from the end of the first track fragment to the beginning of the second track fragment, or (3) matching the track fragment from the first plurality of track fragments with the track fragment of the second plurality of track fragments based on the estimated plurality of average speeds and the set of actual speeds.

Example 9 can include or use, or can optionally be combined with the subject matter of Example 8, to include or use determining a plurality of probability statistics, each probability statistic of the plurality of probability statistics based on an actual speed of the set of actual speeds and a corresponding estimated average speed of the plurality of average speeds, or wherein matching the track fragment from the first plurality of track fragments with a track fragment of the second plurality of fragments includes matching the track fragments corresponding to a smallest residual error of the plurality of residual errors, a highest probability statistic of the plurality of probability statistics, or a combination thereof.

Example 10 can include or use, or can optionally be combined with the subject matter of at least one of Examples 8-9, to include or use (1) receiving data indicating a first actual Time of Arrival (ToA) of a first SIGnal INTelligence (SIGINT) signal at a collector, (2) receiving data indicating a second actual ToA of a second SIGINT signal at the collector, the second actual ToA can be after the first actual ToA, the first and second SIGINT signals can originate from the same emitter, (3) estimating a first set of estimated ToAs of the first SIGINT signal at a collector, each of the first set of estimated ToAs can be based on a different track fragment of a first plurality of track fragments active at the first time, (4) estimating a second set of estimated ToAs of the second SIGINT signal at the collector, each of the second set of estimated ToAs can be based on a different track fragment of a second plurality of track fragments active at the second time, or (5) wherein matching a track fragment of the first plurality of track fragments with a track fragment of the second plurality of track fragments can include matching a track fragment of the first plurality of track fragments with a track fragment of the second plurality of track fragments based on the first and second sets of estimated ToAs and the first and second actual ToAs.

Example 11 can include or use, or can optionally be combined with the subject matter of at least one of Examples 8-10, to include or use (1) estimating a first location and a first covariance of the first SIGINT signal, the first covariance can define a confidence interval associated with the first SIGINT signal originating from the first location, (2) estimating a second location and second covariance of the second SIGINT signal, the second covariance can define a confidence interval associated with the second SIGINT signal originating from the second location, (3) calculating a plurality of residual errors, each residual error can be calculated based on the first and second locations or the first and second estimated ToAs, or (4) wherein matching the track fragment from the first plurality of track fragments with a track fragment of the second plurality of track fragments can include matching the track fragments based on a residual error of the plurality of residual errors.

Example 12 can include or use, or can optionally be combined with the subject matter of at least one of Examples 8-11, to include or use wherein the instructions for estimating the plurality of average speeds can include estimating the plurality of average speeds based on the estimated first and second locations and first and second actual ToAs.

Example 13 can include or use, or can optionally be combined with the subject matter of at least one of Examples 8-12, to include or use generating a first bounding area based on the first covariance, the bounding area can indicate a region in which the first SIGINT signal originated, or determining track fragments that are within the first bounding area so as to define which tracks are in the first plurality of track fragments.

Example 14 can include or use, or can optionally be combined with the subject matter of at least one of Examples 8-13, to include or use generating a second bounding area based on the second covariance, the bounding area indicating a region in which the first SIGINT signal originated, or determining track fragments that are within the second bounding area so as to define which tracks are in the second plurality of track fragments.

Example 15 can include or use subject matter (such as an apparatus including a processor configured to perform acts, a method, a means for performing acts, or a device readable memory including instructions that, when performed by the device, can cause the device to perform acts), such as can include or use (1) receiving data indicating a first actual Time of Arrival (ToA) of a first SIGnal INTelligence (SIGINT) signal at a collector, (2) receiving data indicating a second actual ToA of a second SIGINT signal at the collector, the second actual ToA can be after the first actual ToA, the first and second SIGINT signals can originate from the same emitter, (3) estimating a first set of estimated ToAs of the first SIGINT signal at a collector, each of the first set of estimated ToAs can be based on a different track fragment of a first plurality of track fragments active at the first time, (4) estimating a second set of estimated ToAs of the second SIGINT signal at the collector, each of the second set of estimated ToAs can be based on a different track fragment of a second plurality of track fragments active at the second time, or (5) matching a track fragment of the first plurality of track fragments with a track fragment of the second plurality of track fragments based on the first and second sets of estimated ToAs or the first and second actual ToAs.

Example 16 can include or use, or can optionally be combined with the subject matter of Examples 15, to include or use (1) estimating a first location and a first covariance of the first SIGINT signal, the first covariance defining a confidence interval associated with the first SIGINT signal originating from the first location, (2) estimating a second location and second covariance of the second SIGINT signal, the second covariance can define a confidence interval associated with the second SIGINT signal originating from the second location, (3) calculating a plurality of residual errors, each residual error calculated based on the first and second locations or the first and second estimated ToAs, or (4) wherein matching the track fragment from the first plurality of track fragments with a track fragment of the second plurality of track fragments can include matching the track fragments based on the residual errors.

Example 17 can include or use, or can optionally be combined with the subject matter of at least one of Examples 15-16, to include or use (1) generating a first bounding area based on the first covariance, the bounding area can indicate a region in which the first SIGINT signal originated, (2) determining track fragments that are within the first bounding area so as to define which tracks are in the first plurality of track fragments, (3) generating a second bounding area based on the second covariance, the bounding area can indicate a region in which the first SIGINT signal originated, or (4) determining track fragments that are within the second bounding area so as to define which tracks are in the second plurality of track fragments.

Example 18 can include or use, or can optionally be combined with the subject matter of at least one of Examples 15-17, to include or use estimating a plurality of average speeds, each average speed of the plurality of average speeds can estimate how fast an object on a track fragment from the first plurality of track fragments would have been moving if the track fragment from the first plurality of track fragments is matched with a track fragment from the second plurality of track fragments, or wherein matching the track fragment from the first plurality of track fragments with a track fragment of the second plurality of track fragments can include matching the track fragments based on the estimated average speeds.

Example 19 can include or use, or can optionally be combined with the subject matter of at least one of Examples 15-18, to include or use wherein estimating the plurality of average speeds includes estimating the plurality of average speeds based on the estimated first and second locations and first and second actual ToAs. Example 19 can include or use determining a set of actual speeds of the object based on (1) a distance between a track fragment of the first plurality of track fragments and a second track fragment of the second plurality of track fragments or (2) an elapsed time from the end of the first track fragment to the beginning of the second track fragment, or wherein matching the track fragment of the first plurality of track fragments with a track fragment of the second plurality of track fragments can include matching the track fragments based on the determined actual speeds.

Example 20 can include or use, or can optionally be combined with the subject matter of at least one of Examples 15-19, to include or use determining a plurality of probability statistics, each probability statistic of the plurality of probability statistics can be based on an actual speed of the set of actual speeds and a corresponding estimated average speed of the plurality of average speeds, or wherein matching the track fragment from the first plurality of track fragments with a track fragment of the second plurality of fragments can include matching the track fragments corresponding to a smallest residual error of the plurality of residual errors, a highest probability statistic of the plurality of probability statistics, or a combination thereof.

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions or techniques described herein may be implemented in software or a combination of software and human implemented procedures. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method comprising:
receiving data indicating a first actual Time of Arrival (ToA) of a first SIGnal INTelligence (SIGINT) signal at a collector;
receiving data indicating a second actual ToA of a second SIGINT signal at the collector, the second actual ToA after the first actual ToA, the first and second SIGINT signals originating from the same emitter;
estimating a first location and a first covariance of the first SIGINT signal, the first covariance defining a confidence interval associated with the first SIGINT signal originating from the first location;
generating a first bounding area based on the first covariance and the first location, the bounding area indicating a region in which the first SIGINT signal originated;
estimating a second location and second covariance of the second SIGINT signal, the second covariance defining a confidence interval associated with the second SIGINT signal originating from the second location;
calculating a plurality of residual errors, each residual error calculated based on the first and second locations and the first and second estimated ToAs;
determining track fragments that are within the first bounding area so as to define which tracks are in a first plurality of track fragments;
estimating a first set of estimated ToAs of the first SIGINT signal at a collector, each of the first set of estimated ToAs based on a different track fragment of the first plurality of track fragments active at the first time;
estimating a second set of estimated ToAs of the second SIGINT signal at the collector, each of the second set of estimated ToAs based on a different track fragment of a second plurality of track fragments active at the second time; and
matching a track fragment of the first plurality of track fragments with a track fragment of the second plurality of track fragments based on the first and second sets of estimated ToAs, the first and second actual ToAs, and the residual errors.

2. The method of claim 1, further comprising:
generating a second bounding area based on the second covariance, the bounding area indicating a region in which the first SIGINT signal originated; and
determining track fragments that are within the second bounding area so as to define which tracks are in the second plurality of track fragments.

3. The method of claim 1, further comprising:
estimating a plurality of average speeds, each average speed of the plurality of average speeds estimating how fast an object on a track fragment from the first plurality of track fragments would have been moving if the track fragment from the first plurality of track fragments is matched with a track fragment from the second plurality of track fragments; and
wherein matching the track fragment from the first plurality of track fragments with a track fragment of the second plurality of track fragments includes matching the track fragments based on the estimated average speeds.

4. The method of claim 3, wherein estimating the plurality of average speeds includes estimating the plurality of average speeds based on the estimated first and second locations and first and second actual ToAs: and
the method further comprises:
determining a set of actual speeds of the object based on (1) a distance between a track fragment of the first plurality of track fragments and a second track fragment of the second plurality of track fragments and (2) an elapsed time from the end of the first track fragment to the beginning of the second track fragment; and
wherein matching the track fragment of the first plurality of track fragments with a track fragment of the second plurality of track fragments includes matching the track fragments based on the determined actual speeds.

5. The method of claim 4, further comprising:
determining a plurality of probability statistics, each probability statistic of the plurality of probability statistics based on an actual speed of the set of actual speeds and a corresponding estimated average speed of the plurality of average speeds; and wherein matching the track fragment from the first plurality of track fragments with a track fragment of the second plurality of fragments includes matching the track fragments corresponding to a smallest residual error of the plurality of residual errors, a highest probability statistic of the plurality of probability statistics, or a combination thereof.

6. A non-transitory computer readable storage device comprising instructions stored thereon, the instructions, which when executed by a machine, cause the machine to perform operations comprising:
  receiving data indicating a first actual Time of Arrival (ToA) of a first SIGnal INTelligence (SIGINT) signal at a collector;
  receiving data indicating a second actual ToA of a second SIGINT signal at the collector, the second actual ToA after the first actual ToA, the first and second SIGINT signals originating from the same emitter;
  estimating a first location and a first covariance of the first SIGINT signal, the first covariance defining a confidence interval associated with the first SIGINT signal originating from the first location;
  generating a first bounding area based on the first covariance and the first location, the bounding area indicating a region in which the first SIGINT signal originated;
  estimating a second location and second covariance of the second SIGINT signal, the second covariance defining a confidence interval associated with the second SIGINT signal originating from the second location;
  calculating a plurality of residual errors, each residual error calculated based on the first and second locations and the first and second estimated ToAs;
  determining track fragments that are within the first bounding area so as to define which tracks are in a first plurality of track fragments;
  estimating a first set of estimated ToAs of the first SIGINT signal at a collector, each of the first set of estimated ToAs based on a different track fragment of the first plurality of track fragments active at the first time;
  estimating a second set of estimated ToAs of the second SIGINT signal at the collector, each of the second set of estimated ToAs based on a different track fragment of a second plurality of track fragments active at the second time; and
  matching a track fragment of the first plurality of track fragments with a track fragment of the second plurality of track fragments based on the first and second sets of estimated ToAs, the first and second actual ToAs, and the residual errors.

7. The storage device of claim 6, further comprising instructions, which when executed by the machine, cause the machine to perform operations comprising:
  estimating a plurality of average speeds, each average speed of the plurality of average speeds estimating how fast an object on a track fragment of the first plurality of track fragments would have been moving if the track fragment from the first plurality of track fragments is a match with a track fragment from the second plurality of track fragments;
  determining a set of actual speeds of the object based on (1) a distance between a track fragment of the first plurality of track fragments and a second track fragment of the second plurality of track fragments and (2) an elapsed time from the end of the first track fragment to the beginning of the second track fragment;
  matching the track fragment from the first plurality of track fragments with the track fragment of the second plurality of track fragments based on the estimated plurality of average speeds and the set of actual speeds;
  determining a plurality of probability statistics, each probability statistic of the plurality of probability statistics based on an actual speed of the set of actual speeds and a corresponding estimated average speed of the plurality of average speeds; and
  wherein the instructions for matching the track fragment from the first plurality of track fragments with a track fragment of the second plurality of fragments include instructions, which when executed by the machine, cause the machine to perform operation comprising matching the track fragments corresponding to a smallest residual error of the plurality of residual errors, a highest probability statistic of the plurality of probability statistics, or a combination thereof.

8. The storage device of claim 7, wherein the instructions for estimating the plurality of average speeds include instructions, which when executed by the machine, cause the machine to perform operations comprising estimating the plurality of average speeds based on the estimated first and second locations and first and second actual ToAs.

9. The storage device of claim 6, further comprising instructions, which when executed by the machine, cause the machine to perform operations comprising:
  generating a second bounding area based on the second covariance, the bounding area indicating a region in which the first SIGINT signal originated; and
  determining track fragments that are within the second bounding area so as to define which tracks are in the second plurality of track fragments.

10. An apparatus comprising a processor configured to:
  receive data indicating a first actual Time of Arrival (ToA) of a first SIGnal INTelligence (SIGINT) signal at a collector;
  receive data indicating a second actual ToA of a second SIGINT signal at the collector, the second actual ToA after the first actual ToA, the first and second SIGINT signals originating from the same emitter;
  estimate a first location and a first covariance of the first SIGINT signal, the first covariance defining a confidence interval associated with the first SIGINT signal originating from the first location;
  generate a first bounding area based on the first covariance, the bounding area indicating a region in which the first SIGINT signal originated;
  estimate a second location and second covariance of the second SIGINT signal, the second covariance defining a confidence interval associated with the second SIGINT signal originating from the second location;
  calculate a plurality of residual errors, each residual error calculated based on the first and second locations and the first and second estimated ToAs;
  determine track fragments that are within the first bounding area so as to define which tracks are in the first plurality of track fragments;
  estimate a first set of estimated ToAs of the first SIGINT signal at a collector, each of the first set of estimated ToAs based on a different track fragment of the first plurality of track fragments active at the first time;
  estimate a second set of estimated ToAs of the second SIGINT signal at the collector, each of the second set of estimated ToAs based on a different track fragment of a second plurality of track fragments active at the second time; and match a track fragment of the first plurality of track fragments with a track fragment of the second plurality of track fragments based on the first and second sets of estimated ToAs, the first and second actual ToAs, and the residual errors.

11. The apparatus of claim 10, wherein the processor is further configured to:
generate a second bounding area based on the second covariance, the bounding area indicating a region in which the first SIGINT signal originated; and
determine track fragments that are within the second bounding area so as to define which tracks are in the second plurality of track fragments.

12. The apparatus of claim 10, wherein the processor if further configured to:
estimate a plurality of average speeds, each average speed of the plurality of average speeds estimating how fast an object on a track fragment from the first plurality of track fragments would have been moving if the track fragment from the first plurality of track fragments is matched with a track fragment from the second plurality of track fragments; and
wherein the processor configured to match the track fragment from the first plurality of track fragments with a track fragment of the second plurality of track fragments includes the processor configured to match the track fragments based on the estimated average speeds.

13. The apparatus of claim 12, wherein the processor configured to estimate the plurality of average speeds includes the processor configured to estimate the plurality of average speeds based on the estimated first and second locations and first and second actual ToAs; and the processor is further configured to:
determine a set of actual speeds of the object based on (1) a distance between a track fragment of the first plurality of track fragments and a second track fragment of the second plurality of track fragments and (2) an elapsed time from the end of the first track fragment to the beginning of the second track fragment; and
wherein the processor configured to match the track fragment of the first plurality of track fragments with a track fragment of the second plurality of track fragments includes the processor configured to match the track fragments based on the determined actual speeds.

14. The apparatus of claim 13, wherein the processor is further configured to:
determine a plurality of probability statistics, each probability statistic of the plurality of probability statistics based on an actual speed of the set of actual speeds and a corresponding estimated average speed of the plurality of average speeds; and
wherein the processor configured to match the track fragment from the first plurality of track fragments with a track fragment of the second plurality of fragments includes the processor configured to match the track fragments corresponding to a smallest residual error of the plurality of residual errors, a highest probability statistic of the plurality of probability statistics, or a combination thereof.

* * * * *

UNITED STATES PATENT AND TRADEMARK OFFICE
CERTIFICATE OF CORRECTION

PATENT NO. : 9,977,969 B1
APPLICATION NO. : 14/180453
DATED : May 22, 2018
INVENTOR(S) : Cole et al.

It is certified that error appears in the above-identified patent and that said Letters Patent is hereby corrected as shown below:

On the Title Page

Item (22), in "Filed", in Column 1, Line 1, after "2014", insert --¶(65) Prior Publication Data US 2018/0121735 A1 May 3, 2018--

In the Specification

In Column 2, Line 65, delete "108A-C." and insert --104D-F.-- therefor

In Column 5, Line 37, after "$T_2$", insert --.--

In Column 7, Line 25, delete "1e11" and insert --1e-11-- therefor

In Column 8, Line 12, delete "108" and insert --112-- therefor

In Column 8, Line 13, delete "108" and insert --112-- therefor

In Column 8, Line 19, delete "110 B" and insert --110A-C-- therefor

In Column 8, Line 19, delete "108" and insert --112-- therefor

In Column 8, Line 24, delete "108" and insert --112-- therefor

In Column 8, Line 26, delete "102A-C" and insert --104A-C-- therefor

Signed and Sealed this
Eighteenth Day of June, 2019

Andrei Iancu
*Director of the United States Patent and Trademark Office*